Aug. 8, 1967  H. S. NAGIN ETAL  3,334,555
PAVING UTILIZING EPOXY RESIN
Filed April 29, 1964

*INVENTOR.*
HARRY S. NAGIN.
DONALD H. RUSSELL.
BY
*Christy, Parmelee & Strickland*

ATTORNEYS.

United States Patent Office 3,334,555  
Patented Aug. 8, 1967

3,334,555  
PAVING UTILIZING EPOXY RESIN  
Harry S. Nagin, Merion, Pa., and Donald H. Russell, Pennsauken, N.J., assignors to Reliance Steel Products Company, McKeesport, Pa., a corporation of Pennsylvania  
Filed Apr. 29, 1964, Ser. No. 363,516  
5 Claims. (Cl. 94—3)

This invention relates to paving for traffic bearing surfaces, such as metal plates used on bridge floors, ramps and the like, as well as to concrete highways, bridge floors, air strips, ramps, loading platforms, etc., wherein epoxy resin is employed to bond abrasive grains to a supporting base of metal or concrete. Such paving is disclosed for example in our Patent 2,948,201, granted Aug. 9, 1960.

While metal plates and concrete surfaces prepared as disclosed in said patent have proved highly successful and have gone into relatively extensive use, it has not been as widely accepted as might be expected, and this is especially true on so called checker plates made of steel placed on the traffic lanes of bridges and the like. A reason for this reluctance to use such surfacing is because it is relatively expensive and the applicator cannot guarantee satisfactory performance. This is occasioned by the fact that while many installations have proved satisfactory, other applications have failed because the surface layer breaks loose from the base, or develops cracks, and once breaking or cracking occurs it is likely to progress, especially under very heavy vehicular traffic.

One cause of this is that while the resin itself is very hard and adheres tenaciously to the base, it has a low modulus of elasticity relative to the base, especially a steel plate, so that with the impact of traffic and the thrust of vehicle wheels either in driving a heavy vehicle forward or in applying brakes it is driven against a harder and more unyielding surface. A second cause of failure is due to the fact that as the resin cures, it shrinks, and in shrinking sets up very great stresses either in the resin or the surface to which it is applied. For example, experiments have shown that when a layer of epoxy resin is cured on a glass surface, the contraction of the resin will produce microscopic fractures over the surface of the glass. It is apparent that similar stresses imposed on a concrete road surface will result in similar pulling against the surface of the concrete, weakening it in an unsuspected manner, and that on steel, if the steel surface cannot yield, the stresses will be set up in the resin. Other deteriorating stresses occur because of differences in the coefficients of thermal expansion of the epoxy on the base, which may be compared to crazing of ceramic glazes over pottery.

Failure due to impact has been recognized and attempts have been made to introduce into the resin an extender or plasticizer which will render it more resilient and therefore more resistant to impact, but it has been found that this impairs the ability of the resin to bond so firmly to the abrasive grains. While the immediate effect of the use of such compounds is apparently good, nevertheless, after an undesirable short time the abrasive tends to break out of the surface, exposing more of the resin in the surface and the resin in turn tends to wear away much faster than the abrasive grains. Much depends with paving so prepared on the volume and character of traffic, the care in mixing and applying ingredients, and the temperature extremes to which the surface may be subject.

The present invention has for its object to reduce if not substantially eliminate these erratic performances and provide paving utilizing epoxy resin and abrasive grains on the surface of either metal or concrete which will yield consistently better results under heavy traffic conditions, and substantially reduce, if not eliminate entirely, present causes of failure.

According to our invention the resin is applied in two or more layers. There is an under layer in which a flexibilizing agent is used with the epoxy resin over which there is applied a top and usually a thicker layer of resin in which abrasive grains are embedded as above described, preferably so densely that all of the abrasive grains cannot be wet by the resin. There may, in some cases, be a very thin layer of epoxy resin under the first of the two layers above mentioned.

The epoxy resin which we find highly satisfactory is a commercial grade of a conventional epoxy of the type derived from the condensation reaction of epichlorohydrin and bisphenol having the general chemical structure shown in FIG. 1 on page 169 of "Modern Plastic Encyclopaedia 1963." It is the resin generally known as epoxy resin and the term "epoxy" as herein used refers to such resin. The grade which we prefer to use is a liquid at room temperature of light syrupy consistency having viscosity at 25° C. of between 40 to 160 poises and an epoxide equivalent of 180–195 (such as one described as "Epon" 820 in printed bulletin of the Shell Chemical Corporation SC 58–92, 1958).

As a flexibilizing agent we prefer to use a product which so far as we are aware, is presently commercially available only under the trade-mark "Versamid," which is a product of General Mills, Inc., and which is derived as a condensation product of dimeric fatty acid with polyamines. We prefer grade No. 140, having an amine value of 350 to 400, a viscosity at 40° C. of 150 poises, and a specific gravity of 0.97, but any of the liquid Versamid grades may be used. The resin with the higher amine value is preferred because it induces faster curing of the mixture of the two resins. It will be hereinafter sometimes referred to as flexibilizing resin.

In the practice of our invention, the coating is applied to a concrete base, such as a highway, the surface to be paved is cleaned, as is usual, or if it is applied to a metal plate, the plate is clean and free of scale. A mixture of the epoxy resin and Versamid is prepared just prior to use, since the Versamid or flexibilizing resin functions also as a curing agent or catalyst for the resin. A thin continuous layer of this mix is spread over the area to be covered and permitted to cure until it reaches a somewhat tacky condition. When this stage has been reached, a layer of epoxy resin with a hardening agent is spread over the first. Then dry, coarse abrasive grains are spread over this coating to an extent greater than can be wet by the resin to form as dense an embedded layer of abrasive grains as possible, as explained in our patent above referred to, and curing takes place, after which the unattached abrasive grains are swept off and gathered for reuse.

We prefer to use Versamid in the range of 75 parts to 125 parts by weight of Versamid to 100 parts by weight of epoxy resin, and the preferred ratio is equal parts of epoxy resin and Versamid. With equal parts of Versamid 140 and epoxy resin of the preferred grade, the yield stress p.s.i. is 1900 (0.1 inch/minute rate of elongation at 72° F. and 40% relative humidity). The tensile strength of this mixture is 6,000 pounds per square inch under the conditions above set forth. The elongation is 43%; the elastic modulus p.s.i. is 100,000; the viscous modulus is 50,000; the plastic modulus p.s.i. is 5,500; the impact strength is 6.5 foot pounds per inch, and the adhesion is 10 (determined as a qualitative measure against sheet aluminum with 1 equaling poor adhesion and 10 equaling very strong adhesion). The relatively low elastic modulus of this mixture when cured, plus the high adhesion, make this a preferred ratio. With 75 parts per hundred of Versamid plus 100 of epoxy, the tensile strength is lower, the elastic modulus is higher, and the adhesion is lower. Also using 100 parts of epon resin and 100 parts of Versamid with a hardening agent such as diethylenetriamine, the elastic modulus was higher than where no such hardener was used, and the tensile strength was lower. Ratios in which the Versamid exceeded the epoxy also proved to be less satisfactory under the conditions tested.

From the foregoing there appears to be no advantage in using a hardening agent, such as diethylene triamine (DETA) in addition to Versamid, although its use in this layer is not excluded. Reinforcing fillers such as glass fibers, asbestos, etc. are optional.

In the second layer into which the abrasive grains are embedded we use epoxy resin of the grade above described with about 12 parts of DETA to 100 parts of epoxy resin. Silicon carbide or aluminum oxide granules which are extremely hard and impact-resistant, are preferred, but other hard mineral aggregate may be used.

The undercoat comprising epoxy resin and "Versamid" has relatively better impact strength than the layer comprised of epoxy resin, but has less wear resistance than the epoxy resin surface layer. On the other hand, it has a low modulus of elasticity and is less hard and is slightly more yielding, which qualities may be characterized as resilient. By virtue of this resilience it will absorb or cushion the impact transmitted to it from the surface layer, whereas when epoxy resin is applied directly to concrete or steel without the intervening cushioning layer, the impact at the interface of the resin and steel or concrete produces what may be considered a crushing effect destructive to the bond between the resin and the base. Moreover, as the under layer cures in contact with the base, this elastic or resilient quality will relieve the enormous curing stresses that are set up as the resin shrinks with curing. It will also accommodate itself to the shrinkage which takes place as the top layer cures. This can be demonstrated by applying the mixture of Versamid and epoxy resin to glass and curing it. The microscope fracturing of the glass above described does not occur. In addition this cushioning layer absorbs stresses that occur in use due to temperature variations and the differences in the thermal coefficient of expansion of epoxy resin and base. While the thickness of this under layer or cushioning layer is not critical, it will be adequate if it is of the order of one-sixteenth of an inch, and for best results is thinner than the top layer. The Versamid or flexibilizing resin is not an inert extender for the epoxy resin, but actually copolymerizes with the epoxy to form a cured resin to which each contributes, the final stress absorbing and cushioning properties along with strong adhesion. It will be seen that the abrasive grains themselves are bonded in a matrix of epoxy resin unimpaired by any flexibilizing agent as where such an agent is used as herebefore using but a single layer of epoxy and said agent.

If the top layer of epoxy resin is applied to a depth of one-eighth of an inch, the embedding of the abrasive grains will increase the depth so that the top layer may then be of the order of a quarter of an inch.

In some cases, as where the concrete to be surfaced is badly weathered or porous, it may be desirable to first apply a thin coat or skin coat of epoxy resin similar to the top coat which will wet the surface of the concrete and form a less absorbent surface for the under layer of flexibilizing resin, but which is of negligible thickness so that it is more in the nature of a conditioner rather than a strong coating.

Figure 1:
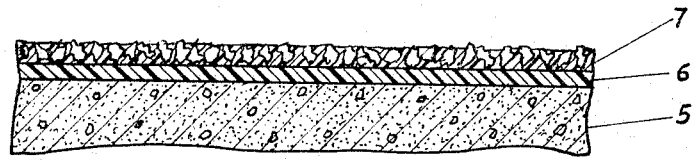
FIG. 1 represents a vertical section through a concrete pavement, typically a vehicular road surface, with our improved surface applied thereto, the view being only illustrative.

Referring to the drawings in detail, and first to FIG. 1, 5 represents the base over which the surface is applied, such as an area of existing new or used concrete roadway or paving. 6 designates the cushioning layer as above described, and 7 is the surface layer with embedded granules therein.

Figure 2:
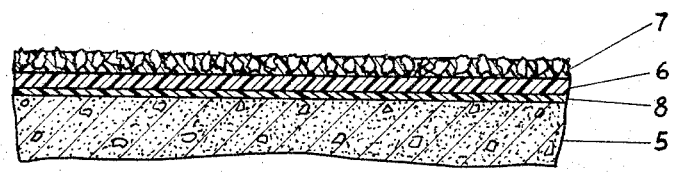
FIG. 2 is a similar view showing the surface coat having three layers instead of two as in FIG. 1.

In FIG. 2 the same reference numerals indicate the same parts as in FIG. 1, 5 being the base, 6 being the cushioning layer, and 7 being the abrasive-filled surface layer. However, at 8 there is indicated a layer of film-like thickness formed of epoxy resin which is applied to the base prior to the application of the cushioning layer. In forming the pavement shown in FIG. 2, the existing solid base material, such as a concrete roadway, is cleaned and then a mixture of epoxy resin with a curing agent is applied as a thin film thereover. Epoxy resin of the type above described is employed along with about 12 parts of DETA as a hardening or curing agent for the resin. When this film has set to a tacky condition the cushioning layer 6 is applied over it, and when the cushioning layer has become tacky, the final surfacing layer is applied. All layers are cured in situ and preferably at about the same time, but with each only partially cured, when the next is applied.

In forming a pavement as shown in FIG. 1, the same procedure is followed, except that the skin coat or film of epoxy resin is not first applied to the existing road surface, but the cushioning layer is applied directly to the base after the base has been cleaned and prepared to be covered.

Figure 3:
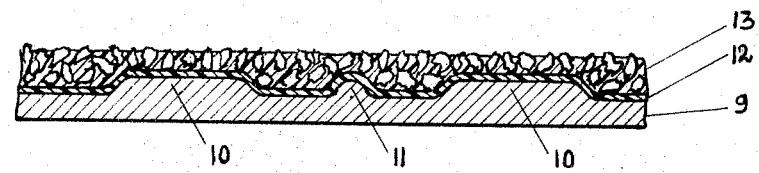
FIG. 3 is a view similar to FIG. 1 wherein the base is a metal checker plate with short raised ribs or protuberances on the top surface which are arranged at right angles to each other as is well known in the art.

Referring now to FIG. 3, 9 designates a section through a rolled metal checker plate of any known or preferred construction, the one here illustrated being one with short ribs or protrusions 10 and 11 at right angles to each other, but it could be a flat steel plate. Typically it is formed of a low carbon steel of approximately ⅛ to ³⁄₁₆ths of an inch in thickness. Where the plate is provided with spaced protrusions 10 and 11, it is preferable that the space inbetween raised portions should not substantially exceed 1½ inches, and it is desirably somewhat closer.

Over the top surface of the metal there is applied the cushioning layer of epoxy resin and a polyamine resin such as Versamid, as above described. When this coating, designated 12, is applied, it is allowed to partially cure to a point where it becomes tacky, whereupon an additional layer 13 of epoxy resin without the flexibilizing resin, or without substantial portions of flexibilizing resin, is applied over the first layer. This layer of epoxy resin includes a catalyst or hardening agent such as diethylene triamine (DETA). After this surface layer has been applied, and before it has cured, abrasive grains are sifted onto it, preferably in a quantity in excess of the amount which the resin can wet, and these grains are pressed into the surface layer. The surface layer is then cured, after which the excess, unattached grains are removed, forming over the surface of the plate a dense layer of abrasive grains which provide a hard roughened surface over the plate with the epoxy, bonding the abrasive grains to each other to the under layer, and the under layer in turn bonds them to the plate itself. The general procedure is the same as described in connection with FIGS. 1 and 2, but in this case the operation is generally performed in a shop, and better control, including the use of heat, is available.

The resin, upon curing, shrinks about the raised projections or protrusions 10 and 11, more tightly bonding the resin to the plate, and forms in addition a bond which is perpendicular, or nearly so, to the surface of the plate, thereby increasing its holding power. The raised areas enlarge the area of contact between the resin and the metal so that it is greater than the projected areas of the plate itself. Also the raised portions 10 and 11 form keys that resist thrusting stresses exerted against the surface when a wheel is moving over it. The surface layer of epoxy resin is applied deep enough so that when the abrasive is added the level of the top surface will be at least as high as the surface of the protrusions to provide a generally planar surface, and it is preferably sufficiently deep that the resin and abrasive grains cover the entire surface, overlying the protrusions also, thereby providing a generally flat or planar surface, except for the irregularities provided by the abrasive grains.

Because of the non-uniform height of the metal under the top layer of abrasive grains by reason of the protrusions, the abrasive grains and the resin will tend to wear away over the protrusions more rapidly than over the areas between the raised portions where the resin is deeper and the effect of the impact is less severe. After a period of use, the abrasive material and resin over the raised areas may wear away, exposing the metal itself, but when this happens, vehicle wheels rolling over the surface will always be in contact with one or more of the raised areas, retarding the wearing away of the intervening abrasive material and resin. The traction surface will thus remain in good condition for a long period of time to prevent skidding, even after the surface of the raised portions 10 and 11 have become exposed to traffic and the exposed raised portions will retard wear of the abrasive surface. If the projections are spaced so that a rubber-tired vehicle wheel rolling over the surface will always be at least partially in contact over a protrusion, as when the space between the protrusions does not substantially exceed 1½ inches lengthwise or crosswise of the plate, the abrasive surfaces will not "cup" or hollow out between protrusions to any appreciable extent. The present invention provides a good surface on a flat metal plate, but has added value and advantage on a checker with surface protrusions.

Figure 4:
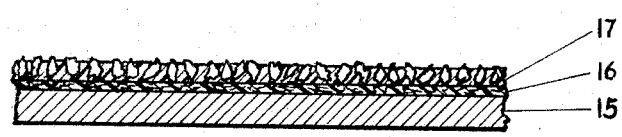
FIG. 4 is a vertical showing a modification utilizing glass fibers in the under layer of resin.

As indicated above, a filler may be used in the flexibilized or somewhat resilient under layer, or glass fibers may be used. This is indicated in FIG. 4 where there is shown a rigid base 15 which may be either metal or concrete, and which may be a plate similar to plate 9 in FIG. 3. Over this is spread the layer of epoxy resin and Versamid as above described, and glass fibers either as a matted sheet, fabric or separated or loose strands are applied to this resin coating while it is still wet and uncured so that the fibers become embedded in the resin, or at least thoroughly wet by the resin. When this cures it becomes an extremely tough, strong, but slightly resilient layer. This composite glass fiber reinforced layer is designated 16 in FIG. 4.

Then the layer of epoxy resin and curing agent is applied along with the abrasive grains as previously described and the resin is cured. In FIG. 4 the epoxy-abrasive grain top layer is designated 17. The inclusion of the glass fibers either as fabric, or a thin felted mat, or loose fibers sifted or spread over the under layer densely enough that the fibers are haphazardly overlapped to provide effectively continuous reinforcing is especially desirable on metal plates where the expense is justified or extremely destructive conditions prevail.

In each of the embodiments here shown the top surface with abrasive grains is comprised essentially of epoxy resin which forms a strong, firm matrix and adhesive for holding the abrasive grains and bonding them to each other and to the underlying resin layer. It is hard and has high impact resistance. The individual grains cannot move relatively to and against one another, as where the resin is resilient or yieldable. The underlying resin layer is relatively less rigid and more resilient so as to absorb and distribute impact and load stresses and relieve the crushing forces that are present at the interface of the hard resin and the base where no such intermediate layer is provided. Also as pointed out, shrinkage stresses that occur as the resin cures are relieved between the base and the epoxy resin-polyamid layer and between the top layer and the base. These factors, plus the relief of stresses that occur because of differences in thermally-induced expansion or contraction, provide a traffic bearing surface which avoids or reduces causes of failure or erratic performance with presently known methods.

We claim:

1. The method of applying a traffic-bearing surface to a rigid base which comprises preparing a mixture of a liquid epoxy resin and a liquid flexibilizing resin for the epoxy which is derived from the condensation reaction of a polyamine and dimeric fatty acid, which resin copolymerizes with the epoxy resin and which has an amine value adequate to cure the epoxy resin, the flexibilizing resin being in the ratio of 75 parts to 125 parts by weight of the flexibilizing resin to 100 parts of epoxy resin, applying the liquid mixture of the two resins over the surface of the base, thereafter applying liquid epoxy resin containing DETA as a curing agent over the first layer, embedding a layer of abrasive grains in the surface of the epoxy resin, and curing both layers in situ on the base.

2. The method defined in claim 1 wherein the second layer of epoxy resin and DETA is applied after the first layer of epoxy resin and flexibilizing resin has cured to a tacky condition, but before curing is complete.

3. The method of applying a traffic-bearing surface to a rigid base as defined in claim 1 wherein the base is a metal plate.

4. A traffic-bearing pavement comprising a continuous rigid supporting base, a cushioning layer over said supporting base and bonded thereto in situ comprising a copolymer of epoxy resin and a flexibilizing resin for the epoxy derived from the reaction of a polyamine with a dimeric fatty acid, the flexibilizing resin ranging between 75 and 125 parts by weight of the flexibilizing resin to 100 parts of an epoxy resin, and a harder, stronger layer covering said first layer which consists of epoxy resin and a curing agent cured in contact with the first layer and having abrasive grains embedded therein and adhered to the surface thereof.

5. A checker plate for traffic-bearing structures comprising a continuous metal plate having protrusions formed on that surface which is the upper surface, a resinous layer covering said upper surface comprised of epoxy resin and a resin which is both a curing agent for the epoxy and copolymerizes with it and which is derived from the condensation reaction of polyamine with dimeric fatty acid, said resin being in the range of 75 to 120 parts of said condensation reaction product to 100 parts of epoxy resin, and a second layer comprising epoxy resin and diethylenetriamine.

References Cited

UNITED STATES PATENTS 2,934,452 4/1960 Sternberg _____ 117—2
2,948,201 8/1960 Nagin et al. _____ 94—5

OTHER REFERENCES

Engineering News Record, Oct. 18, 1962, pp. 42–43, 44.
Modern Plastics, September 1954, p. 155.

JACOB L. NACKENOFF, *Primary Examiner.*